(12) United States Patent
Mayerle et al.

(10) Patent No.: US 9,070,097 B2
(45) Date of Patent: Jun. 30, 2015

(54) SEAMLESS MORPHING FROM SCENARIO MODEL TO SYSTEM-BASED INSTANCE VISUALIZATION

(75) Inventors: Jochen Mayerle, Flein (DE); Johan Christiaan Peters, Sankt Leon-Rot (DE); Marianne Brosche, Heidelberg (DE); Joachim Fessler, Grafenberg (DE); Ulrich Keil, Heidelberg (DE); Holger Knospe, Wiesloch (DE)

(73) Assignee: SAP SE, Walldorf (DE)

( * ) Notice: Subject to any disclaimer, the term of this patent is extended or adjusted under 35 U.S.C. 154(b) by 589 days.

(21) Appl. No.: 13/326,279

(22) Filed: Dec. 14, 2011

(65) Prior Publication Data

US 2013/0159908 A1  Jun. 20, 2013

(51) Int. Cl.
*G06F 3/048* (2013.01)
*G06Q 10/06* (2012.01)

(52) U.S. Cl.
CPC ....................................... *G06Q 10/06* (2013.01)

(58) Field of Classification Search
None
See application file for complete search history.

(56) References Cited

U.S. PATENT DOCUMENTS

| | | | |
|---|---|---|---|
| 5,877,766 A | | 3/1999 | Bates et al. |
| 6,065,009 A | * | 5/2000 | Leymann et al. ................... 1/1 |
| 7,113,923 B1 | | 9/2006 | Brichta et al. |
| 7,280,793 B2 | | 10/2007 | Zess et al. |
| 7,711,694 B2 | | 5/2010 | Moore |
| 7,716,278 B2 | | 5/2010 | Beringer et al. |
| 7,735,022 B2 | | 6/2010 | Danninger et al. |
| 7,853,607 B2 | | 12/2010 | Moore et al. |
| 7,925,985 B2 | | 4/2011 | Moore |
| 8,046,716 B2 | | 10/2011 | Nelson |
| 8,181,150 B2 | | 5/2012 | Szpak et al. |
| 8,261,233 B2 | | 9/2012 | Szpak et al. |
| 8,332,405 B2 | | 12/2012 | Wagenblatt et al. |
| 8,468,491 B2 | | 6/2013 | Markovic |
| 8,621,421 B2 | | 12/2013 | Klaka et al. |
| 2002/0128890 A1 | * | 9/2002 | Dick et al. ........................ 705/8 |
| 2003/0154090 A1 | | 8/2003 | Bernstein et al. |
| 2003/0158832 A1 | | 8/2003 | Sijacic et al. |

(Continued)

OTHER PUBLICATIONS

"Object Interactions in Graphical Interface for Print Administration." *IBM Technical Disclosure*. Oct. 1996.

(Continued)

*Primary Examiner* — Stephen Alvesteffer
(74) *Attorney, Agent, or Firm* — Mintz Levin Cohn Ferris Glovsky and Popeo, P.C.

(57) ABSTRACT

A single meta-model can include metadata defining a business scenario landscape that includes business scenarios accessible to members of an organization that are supported by a business software architecture. The metadata can include business process definitions and relationships between business processes. A user interface can present first, second, and/or third visualization layers based on the metadata. The first visualization layer can include first user interface elements forming a business scenario landscape map showing business scenarios and at least one relationship between the business scenarios. The second visualization layer can include second user interface elements displayed in a navigation pane concurrently with a work pane. The second user interface elements can represent a linear sequence of second business processes of a business scenario while the work pane can include additional user interface elements corresponding to functionality provided by the business software architecture relating to a currently selected business process.

19 Claims, 10 Drawing Sheets

(56) References Cited

U.S. PATENT DOCUMENTS

| | | |
|---|---|---|
| 2003/0216928 A1 | 11/2003 | Shour |
| 2004/0010502 A1 | 1/2004 | Bomfim et al. |
| 2004/0030992 A1 | 2/2004 | Moisa et al. |
| 2004/0078258 A1* | 4/2004 | Schulz et al. .................. 705/9 |
| 2004/0102990 A1 | 5/2004 | Jones |
| 2004/0107414 A1 | 6/2004 | Bronicki et al. |
| 2004/0119752 A1 | 6/2004 | Beringer et al. |
| 2004/0181775 A1 | 9/2004 | Anonsen et al. |
| 2005/0004825 A1 | 1/2005 | Ehrler et al. |
| 2005/0155000 A1 | 7/2005 | Weiler et al. |
| 2005/0262008 A1 | 11/2005 | Cullen et al. |
| 2006/0005140 A1 | 1/2006 | Crew et al. |
| 2006/0015383 A1 | 1/2006 | Beringer et al. |
| 2006/0074703 A1 | 4/2006 | Bhandarkar et al. |
| 2006/0074730 A1 | 4/2006 | Shukla et al. |
| 2006/0074736 A1 | 4/2006 | Shukla et al. |
| 2006/0074915 A1 | 4/2006 | Bhandarkar et al. |
| 2006/0149568 A1 | 7/2006 | Dreiling et al. |
| 2006/0206348 A1 | 9/2006 | Chen et al. |
| 2006/0206366 A1 | 9/2006 | Habib et al. |
| 2007/0156649 A1 | 7/2007 | Fischer |
| 2007/0162500 A1 | 7/2007 | Herwadkar |
| 2007/0192715 A1 | 8/2007 | Kataria et al. |
| 2007/0226038 A1 | 9/2007 | Das et al. |
| 2007/0233508 A1 | 10/2007 | Gillespie |
| 2007/0245300 A1 | 10/2007 | Chan et al. |
| 2007/0265862 A1 | 11/2007 | Freund et al. |
| 2007/0271526 A1 | 11/2007 | Powley |
| 2007/0276714 A1 | 11/2007 | Beringer |
| 2008/0040191 A1 | 2/2008 | Chakravarty et al. |
| 2008/0052274 A1 | 2/2008 | Moore et al. |
| 2008/0052358 A1 | 2/2008 | Beaven et al. |
| 2008/0065675 A1 | 3/2008 | Bozich et al. |
| 2008/0077530 A1 | 3/2008 | Banas et al. |
| 2008/0140472 A1 | 6/2008 | Gilat et al. |
| 2008/0168376 A1 | 7/2008 | Tien et al. |
| 2008/0177622 A1 | 7/2008 | Akkiraju et al. |
| 2009/0006146 A1 | 1/2009 | Chowdhary et al. |
| 2009/0006150 A1* | 1/2009 | Prigge et al. .................. 705/7 |
| 2009/0070698 A1 | 3/2009 | Shurtleff et al. |
| 2009/0106640 A1 | 4/2009 | Handy et al. |
| 2009/0210268 A1 | 8/2009 | Fan et al. |
| 2010/0082292 A1 | 4/2010 | Pantaleano et al. |
| 2010/0083374 A1 | 4/2010 | Schmitlin et al. |
| 2010/0121740 A1 | 5/2010 | Reed et al. |
| 2010/0185474 A1 | 7/2010 | Frank |
| 2011/0071869 A1 | 3/2011 | O'Brien et al. |
| 2011/0082721 A1 | 4/2011 | Arni et al. |
| 2011/0125756 A1 | 5/2011 | Spence et al. |
| 2011/0145738 A1 | 6/2011 | Laugwitz et al. |
| 2012/0059842 A1 | 3/2012 | Hille-Doering et al. |
| 2012/0090037 A1 | 4/2012 | Levit |
| 2012/0136693 A1 | 5/2012 | Patil et al. |
| 2012/0311451 A1 | 12/2012 | Beaven |
| 2013/0024795 A1 | 1/2013 | Robotham et al. |
| 2013/0159007 A1 | 6/2013 | Brosche et al. |
| 2013/0159034 A1 | 6/2013 | Herter et al. |
| 2013/0159036 A1 | 6/2013 | Keil et al. |
| 2013/0159037 A1 | 6/2013 | Keil et al. |
| 2013/0159047 A1 | 6/2013 | Mayerle et al. |
| 2013/0159060 A1 | 6/2013 | Steinbach |
| 2013/0159061 A1 | 6/2013 | Fessler et al. |
| 2013/0159063 A1 | 6/2013 | Fessler et al. |
| 2013/0159199 A1 | 6/2013 | Keil et al. |
| 2013/0159896 A1 | 6/2013 | Mayerle et al. |
| 2013/0159898 A1 | 6/2013 | Knospe et al. |
| 2013/0159906 A1 | 6/2013 | Knospe et al. |
| 2013/0159907 A1 | 6/2013 | Brosche et al. |

OTHER PUBLICATIONS

Rockwell Automation, Arena Training Course (2005).

* cited by examiner

SEAMLESS MORPHING FROM SCENARIO MODEL TO SYSTEM-BASED INSTANCE VISUALIZATION

CROSS-REFERENCE TO RELATED APPLICATIONS

The current application is related to the following co-pending and co-owned U.S. patent applications, the disclosure of each of which is incorporated herein in its entirety: application Ser. No. 13/326,270, filed Dec. 14, 2011, entitled "Business Process Guide and Record"; application Ser. No. 13/325,546, filed Dec. 14, 2011, entitled "Monitoring and Control of Business Processes and Scenarios"; application Ser. No. 13/325,605, filed Dec. 14, 2011, entitled "Runtime Generation of Instance Contexts Via Model-Based Data Relationships"; application Ser. No. 13/325,632, filed Dec. 14, 2011, entitled "Visualizing Business Processes or Scenarios in a Business Software Model Using Transit Maps"; application Ser. No. 13/326,026, filed Dec. 14, 2011, entitled "Displaying and Changing Scenario-Based or Process-Based business Configurations"; application Ser. No. 13/326,052, filed Dec. 14, 2011, entitled "Incorporating External Business Process Features Into a Scenario Visualization or Navigation Tool"; application Ser. No. 13/326,075, filed Dec. 14, 2011, entitled "Dynamic Business Scenario Key Performance Indicator Definitions, Real Time Calculations, and Analysis; application Ser. No. 13/326,190, filed Dec. 14, 2011, entitled "Dynamic Enhancement of Context Matching Rules for Business Scenario Models"; application Ser. No. 13/326,230, filed Dec. 14, 2011, entitled "Launch of Target User Interface Features Based on Specific Business Process Instances"; application Ser. No. 13/326,254, filed Dec. 14, 2011, entitled "Multilevel Visualization of Scenario Models and Scenario Instances"; application Ser. No. 13/326,261, filed Dec. 14, 2011, entitled "Process-Based User Authorization Management"; application Ser. No. 13/326,266, filed Dec. 14, 2011, entitled "Correlation-Based Dynamic Determination of Transactional Instance Contexts"; and Ser. No. 13/326,279, filed Dec. 14, 2011, entitled "Seamless Morphing from Scenario Model to System-Based Instance Visualization".

TECHNICAL FIELD

The subject matter described herein relates generally to enhancing user interaction with, and navigation among, features, functions, controls, and the like of an integrated software suite, such as for example an enterprise resource planning solution.

BACKGROUND

The inherent complexity of business processes and their implementation in business software solutions, enterprise resource planning (ERP) systems, and the like can present substantial challenges to users and can be a serious obstacle to widespread operative use of process models in the software landscape. A wealth of highly technical process modeling notations (e.g. business process modeling notation (BPMN) editors and process engines, enhanced process chains (EPC), modeling hierarchies built on these or similar model types, etc.) is currently available for use in technical systems. However, these types of resources are typically difficult for a non-technical user to understand and use. Accordingly, while a software developer might, for example, use one of these technical process modeling notations, less technical users, such as for example software sales representatives, software implementation consultants, business users, key users or administrators of a business software solutions, and the like more typically use one or more non-technical (or less technical) visualization tools to visualize the inherent complexity of business processes and business scenarios and their implementation in ERP or other business software solutions. Implementing a variety of visualization tools with significantly varying degrees of depicted complexity can be challenging, particularly given the potential for miscommunication or other inefficient exchanges of important information between interested parties if the different visualization modes are not supported in a manner that facilitates uniformity of data presentation and entry between the available tools.

SUMMARY

In one aspect, a computer-implemented method includes receiving, via interaction by a user with a first visual depiction relating to a first abstraction layer of a single meta-model, a navigation command requesting transitioning of the first visual depiction to a second visual depiction relating to a second abstraction layer of the same single meta-model. The single meta-model includes metadata defining a business scenario landscape, which includes a plurality of business scenarios accessible to members of an organization and supported by a business software architecture. The metadata include business scenario definitions and relationships between business scenarios in the business scenario landscape. Through visual morphing, a transition from the first visual depiction to the second visual depiction is supported. The first visual depiction and the second visual depiction contain different levels of detail relating to a business scenario within the business scenario landscape for the organization. Through each of the first visual depiction and the second visual depiction displayed on a display device, direct access to user interface features is provided via which the user is enabled to perform at least one of viewing, modifying, entering, and creating transaction data relating to a specific instance of the business scenario.

In some variations one or more of the following features can optionally be included in any feasible combination. The first visual depiction can optionally include first user interface elements forming a business scenario landscape map showing the business scenario and at least one other business scenario of the plurality of business scenarios and at least one relationship between the business scenario and the at least one other business scenario. The first user interface elements can optionally be arranged in the first visualization layer to form a scenario-centric view in which the business scenario is arranged approximately centrally in a scenario landscape map within the first visual depiction and with those of the plurality of first user interface elements representing business process features of the business scenario arranged substantially centrally and in a linear succession to show a linear ordering of the business process features and in which the at least one other business scenario is arranged to show the at least one relationship to the business scenario. The second visual depiction can optionally include second user interface elements displayed in a navigation pane concurrently with a work pane. The second user interface elements can optionally be arranged in a linear progression to represent a linear sequence of a plurality of business process features of the business scenario. The work pane can optionally include a plurality of additional user interface elements corresponding to functionality provided by one or more feature modules of the business software architecture related to a currently selected one of the plurality of business process features. The single meta-model further can optionally include at least one of concrete data, detailed instance information, key performance indicators, configuration information, and organizational references. The concrete data, detailed instance information, key performance indicators, configuration information, and organizational references can optionally be associated with at least one of an in-progress instance of the business scenario and one or more completed instances of the business scenario. Access can optionally be provided to the first visual depiction in response to selection by the user of a scenario browser user interface element in a welcome screen of the business software architecture.

Implementations of the current subject matter can include, but are not limited to, systems and methods consistent including one or more features are described as well as articles that comprise a tangibly embodied machine-readable medium operable to cause one or more machines (e.g., computers, etc.) to result in operations described herein. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

Implementations of the current subject matter can provide one or more advantages. For example, multiple levels (e.g. at least three levels in some implementations) of abstraction layers representing business scenario and/or business process features and interactions at increasing levels of detail and complexity can be seamlessly visualized using an integrated tool. Inter-scenario relationships, overviews of specific business scenarios in a simplified linearized view, and business scenario structures showing full details of each business process underlying a business scenario can be linked and dynamically navigable to represent a business scenario template for each business scenario and for the scenario landscape as a whole and also to visually display one or more progress and/or completion details for specific business scenario instances. Seamless navigation between the multiple levels of abstraction layers representing business scenario and/or business process features and interactions can enable efficient navigation through role-specific visualizations with defined transition capabilities based on consistent process metadata; accelerate sales cycle through seamless transition from a high-level fit gap to the implemented processes in the business software architecture; improve convenience and precision of communications between business users and IT experts; provide a closed loop between scenario and process views in software development, sales, implementation, and use; and facilitate the use of business process management on multi-touch and similar mobile (e.g. laptops, cellular phones, smart phones, personal digital assistants, etc.) stationary (e.g. desktop computers, fixed terminals, etc.) devices.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to an enterprise resource software system or other business software solution or architecture, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Figure 1:
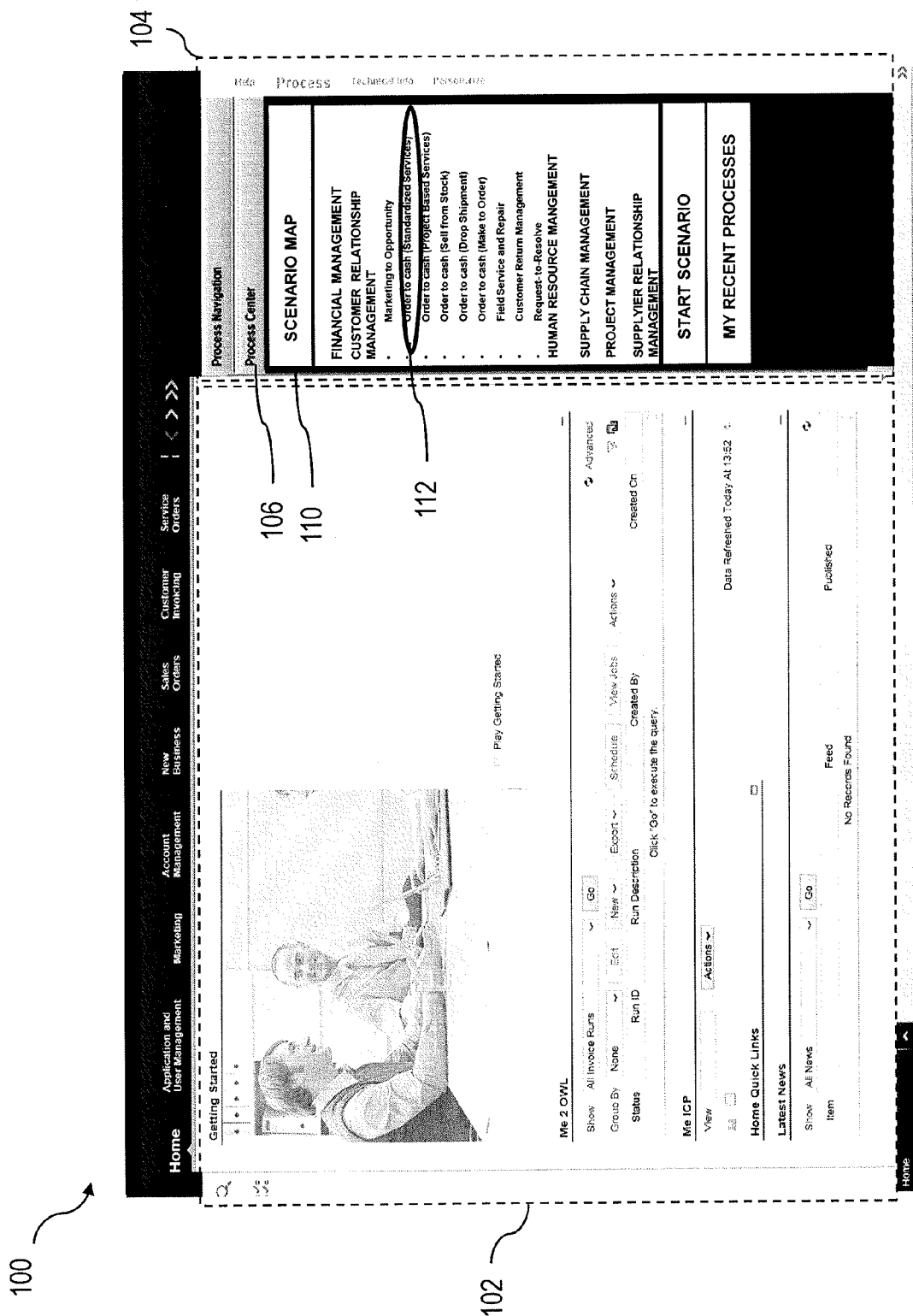
FIG. 1 shows a screenshot of a user interface illustrating a scenario landscape overview view.

The complexity of modern business software solutions can prevent full realization and use of the value of these tools. It can be difficult to make business process technology truly accessible, appealing, and useful using only a stand-alone, non-integrated visualization or overview map. Rather, there is a need for a structured and variably detailed abstraction model that can present the dozens to thousands of objects, systems, rules, events, relationships and persons involved in a realistic, operational business scenario in a manner that preserves overview without losing essential detail.

Morphing is a visual effect in animations in which a displayed feature (or features) is changed or morphed into another displayed feature (or features) via a seamless (or at least apparently seamless) visual transition. Methods, systems, articles of manufacture, and the like consistent with one or more implementations of the current subject matter can, among other possible advantages, provide a multi-level abstraction layer structure via which a user can access increasing levels of complexity and detail regarding any of the business scenarios included in an organization's scenario landscape. Morphing techniques can be applied to morph from visualizations depicting high-level scenario overviews of a scenario landscape of an organization's business configuration down to highly technical process modeling notations, such as for example BPMN based editors and process engines. In this manner, the user can be enabled to access information about the scenario landscape, individual business scenarios and business processes within the scenario landscape, and specific instances of those business scenarios and business processes via an integrated interface that provides a necessary balance between overview and detail.

A scenario landscape for an organization can refer to a set including all or some of the business scenarios and/or business processes characterizing an organization's operations. In general a business scenario can include one or more business processes, process steps, or other business process features. Business process features can include, but are not limited to, one or more of business processes, process steps, sub-processes, tasks, activities, user roles, data objects and the like. The business scenarios and business processes can be managed, and tasks relating to the completion of one or more steps of the business processes can be supported by, one or more feature modules of a business software architecture, such as for example an enterprise resource planning (ERP) system. The terms "instance of a business process," "instance of a business scenario," and similar descriptive terminology is intended to refer to a specific execution of a business process or a business scenario, respectively. For example, for a business scenario relating to sale of a product, each order taken and filled for that product can be considered as an instance of the business scenario. A business configuration can be a set of business scenarios including sets of business processes or business process features supported by the business software architecture and optionally customized to reflect the actual, real-life business functions (e.g. end-to-end business processes) performed by employees or other organization members on a recurring basis. A business configuration for an organization customer of a business software architecture is usually set up upon initial installation with occasional modifications or updates provided to reflect changes to the underlying real-life processes and procedures. Such a business configuration is typically constructed like a catalog, and its functions can be structured according to business areas, packages, topics and options. Once the initial business configuration is set up, all decisions are made, and the scoping is done, the business software architecture is ready for productive usage.

Business scenario information can be efficiently broken down into a uniform structure that makes it consumable for all users of a system, for example for non-technical users; allows tool builders to design attractive visualization and editing tools separately for each level; fosters communication about business process models across departments, for example between technical and business-focused departments that typically have to find a common agreement of a business process in order to implement it; and removes the necessity for model transformations, which can be complex and time consuming, as all information about a business scenario can be contained in a single meta-model. The abstraction levels can be linked such that changes on one level cannot invalidate other levels, but rather, a change on one level of the abstraction model can be immediately reflected on all other levels assuming that a level of detail is present on another level to reflect the change. For example, a change to a high level overview can create or modify a shell feature on a more detailed level into which additional detail can be added. On the other hand, a minor change to a feature at a lower, more detailed level of the abstraction model might not affect a view at a higher overview level if the modified or added or deleted feature was not directly shown at that level due to the reduced level of detail presented in the overview. All model levels, even the pure overview level, which in currently available solutions is typically captured with drawing tools external to the business software architecture, can be presented as linked operative models that allow a drill down to any level of detail and even to operative execution, including all data objects involved in that process instance.

In an implementation, abstraction layers of a business scenario landscape abstraction model can include one or more of a scenario overview map, a linear single scenario view, and a structured scenario or process detail view. Navigation between these views can be provided by typical user interface links. For example, clicking or selecting an icon in one view can link to a relevant and related feature in one of the other layers. Further details regarding this feature are discussed below. In some implementations, a single meta-model can be used to define the information required to extract and render the model details required on each of the three (or more or fewer) levels of the abstraction model. Having a single meta-model can be advantageous in avoiding inconsistencies that otherwise (e.g. by using unrelated models per level) would be very hard to prevent. With individual models per level, navigation and cross-checks would be much harder to implement.

Visual morphing approaches consistent with implementations of the current subject matter can include one or more of the following features. A single underlying scenario or process meta-model integrated with real scenario instances and/or process instances can enable visual morphing. Transitions between a solely scenario or process meta-model-based visualization and real scenario or process instances based on transactional data (e.g. transactional data stored within or accessible to an ERP system or other business software solution) can be tailored according to user roles, permissions, etc. Navigation between different levels of the hierarchy of abstract layers supported by the underlying scenario or process meta-model can be seamless or at least approximately seamless. In other words, display elements (scenarios, processes, process steps etc.) on all levels can be made consistent to provide each party contributing to design, operation, support, execution, or the like of a business process or scenario with a common and consistent display paradigm for necessary communications and interactions. Morphing navigation can be a multidirectional process. It can be possible to navigate from a higher abstraction level, scenario overview level, or the like down to a process status monitoring level and vice versa. Zoom-in and zoom-out behavior can be supported, for example by multi-touch devices capable of simultaneously registering two or three or more distinct positions of input touches, through a dedicated click behavior that navigates from one visualization level to another, or through any other kind of input device.

At a first launch level of a business software architecture consistent with an implementation of the current subject matter, a user can be presented with a view such as is shown in the screenshot 100 of FIG. 1. A work pane 102 contains a front end work space screen that includes user interface elements with which a user can activate or interact to perform various tasks relating to his or her role, position, daily workflow, etc. A navigation pane 104 can include user interface elements providing access to scenario browser or process navigation features. For example, interaction with a process center or scenario browser navigation element 106 can direct the user to a scenario map feature 110, which can display user interface elements relating to one or more business scenarios available to the user. FIG. 1 shows categories of business scenarios that include financial management, customer relationship management, human resource management, supply chain management, project management, and supplier relationship management. The customer relationship management category has been expanded to show a group of business scenarios within that category.

Figure 2:
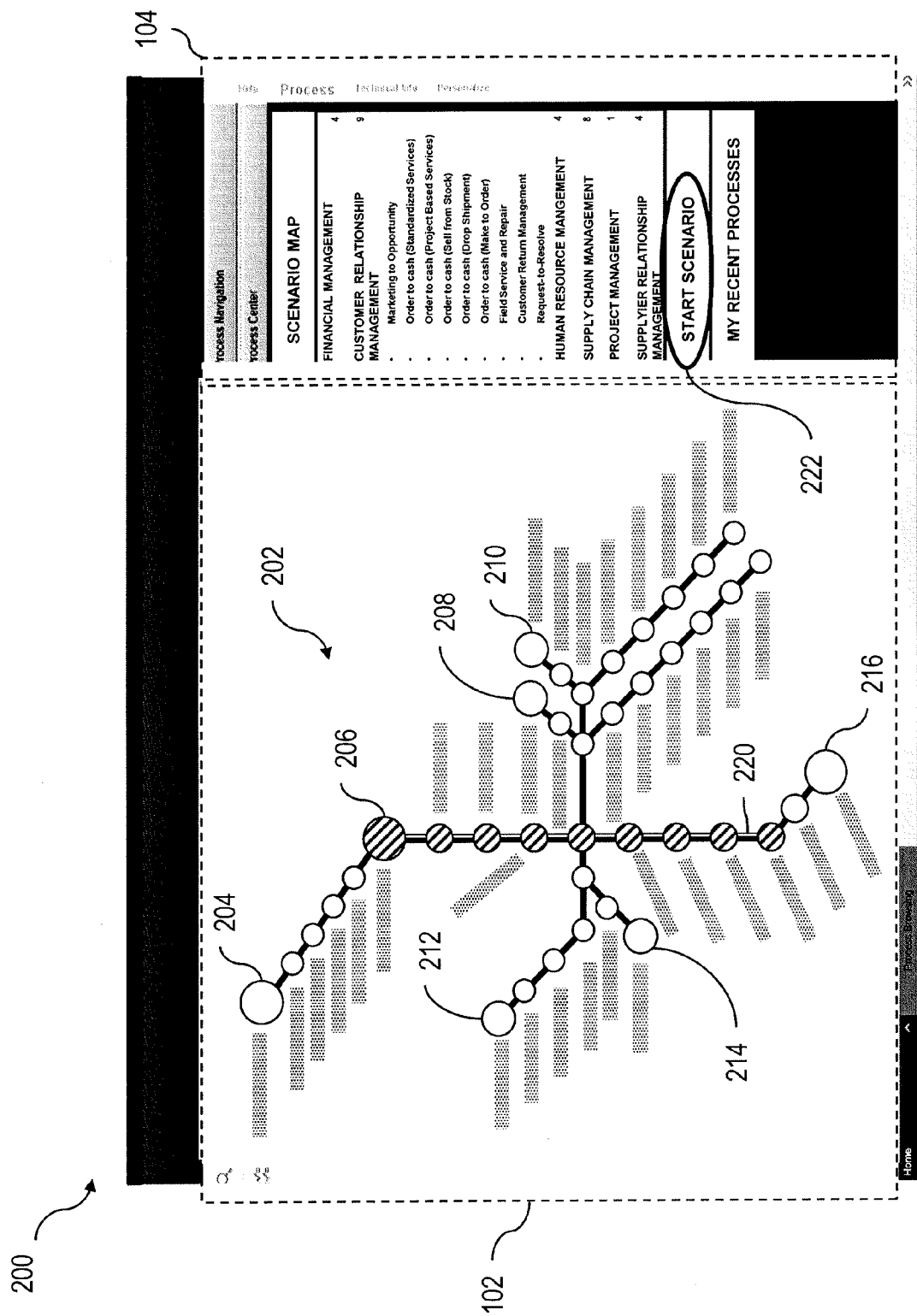
FIG. 2 shows another screenshot of a user interface illustrating a linear single business process view (center) with its connections to a set of related business processes within a process landscape.

Selection of the user interface element 112 relating to the business scenario order to cash (standardized services) can cause the initially displayed content in the work pane 102 to be replaced by a scenario landscape overview map 202 as shown in the screenshot 200 of FIG. 2. This scenario landscape overview map 202 can include relational links between a plurality of business scenarios in a scenario landscape. Each of several business scenarios 204, 206, 208, 210, 212, 214, 216 are shown at a linear overview degree of detail to depict the relations between the different business scenarios 204, 206, 208, 210, 212, 214, 216 in the scenario landscape. In an implementation, the overview map 202 can be modeled as a transit map that shows the place and the function of each business scenario in the scenario landscape as a whole. As shown in FIG. 2, the business scenarios and/or the business processes included within the business scenarios can be labeled in a manner similar to stops on a transit map.

The scenario landscape overview map 202 can advantageously be arranged in a scenario-centric manner, for example such that a specific, currently active business scenario 206 is arranged approximately centrally in the overview diagram with other related business scenarios (e.g. including but not limited to the business scenario relationships explained in the preceding paragraph) shown branching or intersecting with the currently active business scenario 206. The scenario overview map 202 can also advantageously include one or more visual cues to indicate information about the various business scenarios and/or the business processes shown in the scenario overview map 202. For example, the route line 220 of the currently active business scenario 206 can be shown in a different thickness, with a different pattern, in a different color or brightness, or some other visual highlighting technique, and the business processes of the currently active business scenario 206 can likewise be shown with a different pattern, color, brightness, etc. Clicking on a business process of the currently active business scenario 206 can directly navigate a user to a linear single scenario view of the currently active business scenario displayed simultaneously with a work space including user interface elements related to completion, monitoring, etc. of a selected business process within the business scenario. Clicking on a business process of another business scenario besides the currently active business scenario 206 can cause the scenario overview map 202 to rearrange (e.g. "morph") to show the scenario landscape with a new scenario-centric view based on the newly selected business scenario.

Figure 3:
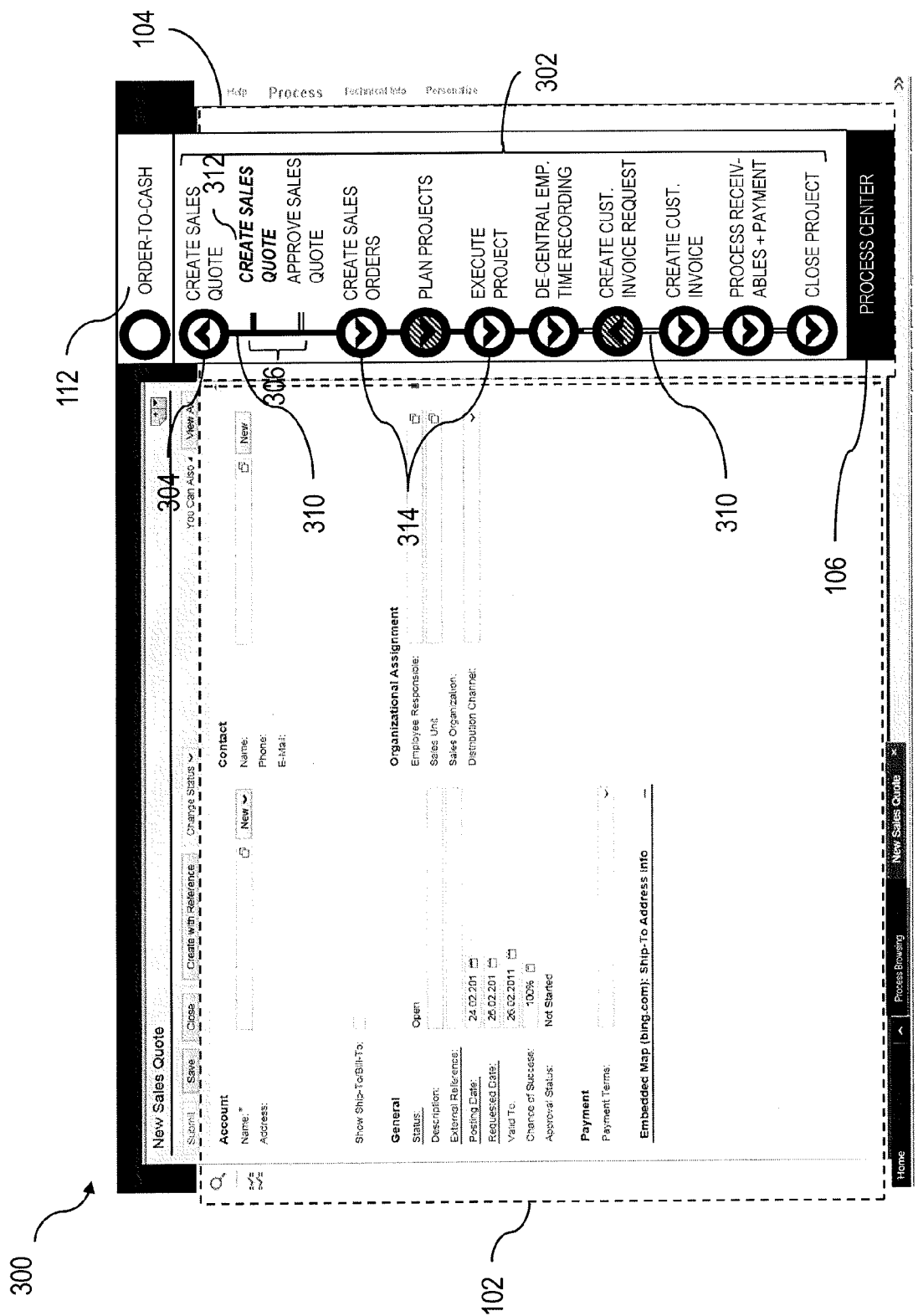
FIG. 3 shows another screenshot of a user interface illustrating a structured business process detail view (right) associated with a particular user screen implementing one of the process' steps.

Selection of a start scenario user interface element 222 in the navigation pane 104 can cause the displayed elements to morph to a view having one or more characteristics similar to the screenshot 300 of FIG. 3, in which a single business scenario is displayed in the navigation pane 104 as a linear sequence of business processes, which can in turn include additional tasks or process sub-steps. The structure of the business scenario is condensed into a linear view, even though the actual flow of tasks and other actions necessary to complete an instance of the business scenario often involves explicit parallelism, decisions, loops, event driven changes in control flow, exceptions, and the like. Consistent with the scope of the current subject matter, any viable approach can be used to shape a business scenario into such a linear view.

As shown in FIG. 3, a plurality of first user interface elements 302 are displayed in the navigation pane 104 and arranged in a linear progression to represent the linear sequence of business process features in the scenario model of the currently actively business scenario. A first user interface element 304 corresponding to a business process having additional process steps can be expanded as shown in FIG. 2 to display additional user interface elements 306 corresponding to the process steps. Also as shown in FIG. 2, the currently active business scenario can be identified by one or more scenario identifier user elements 112. A scenario browser user interface element 106 can link to the upper level scenario landscape overview map 202, for example as shown in FIG. 2, to display an overall scenario landscape map showing intersections between scenarios and providing links to navigate to the other scenarios in the scenario landscape.

The first user interface elements 302 can be displayed in a manner similar to a transit route map with each business process feature (e.g. business process, process step, etc.) being represented like a stop on the route. In this manner, a familiar visual format can rapidly convey additional information about a current context within a specific instance of the business scenario as well as status information about the various business processes that form the "route" to completion of the instance of the business scenario. For example, a route line 310 connecting the "stops" can be presented with a first visual effect (e.g. color, brightness, shade, dots or dashes, etc.) up to the "stop" representing the business process that is currently "active" with related functionality being provided in the work pane 102. The currently active business process feature can be further indicated using textual or visual cues, such as for example color, shading, font, a highlighting box, etc. As a non-limiting example, the name of the business process displayed in conjunction with the user interface element 312 corresponding to the currently active business process in FIG. 3 is formatted in a bold and italicized font. In a further implementation, the display texts of the scenario, processes, process steps, and/or other business process features can be adapted to reflect details of a particular process instance, e.g. by inserting specific names, document identifications, specific deadlines, customer names, etc. that are drawn from the current process instance, for example as discussed in greater detail below. A different second visual effect can be used for the route line 310 leading to the "stops" past the currently active business process. The icons 314 used to represent the "stops" in the scenario navigation pane can also include visual cues to inform a user about status, other business processes that are included within the currently displayed business process user interface elements and that can be revealed by a user action to expand the route map, or the like.

FIG. 3 shows an illustrative example of a structured business scenario or business process detail view 300, which shows the structure of a business scenario or business process, for example using a chosen modeling paradigm (e.g. a flow paradigm, a rule based paradigm, a data flow based paradigm, etc.). On this level of the abstraction model, each business process or process step, task, etc. can be displayed (opened) inline or via navigation so as to allow drill-down to the level of elementary activities (process steps) and their artifacts like data objects, responsibility rules, events, etc. This level of the abstraction layer can be implemented using a conventional visualization model, such as for example business process diagrams (BPDs) or flow charts created with business process model and notation (BPMN), unified modeling language (UML), event-driven process chains (EPCs), etc.

Seamless navigation between adjacent levels, for example between a welcome screen as shown in the screen 100, the scenario landscape overview map view 202 shown in the screenshot 200, and the linear single scenario view of shown in the screenshot 300, can be provided to ensure availability of more detail (e.g. by navigating downward) and more overview (e.g. by navigating upward) without overloading any individual level. Because a single, unified underlying meta-model provides the basis for all levels of the abstraction model from which each view layer is fed and rendered, introduction of inconsistencies between different levels can be avoided. The metadata can be linked and can be automatically checked. It should be understood by one of ordinary skill in the art that use of the term "single" in descriptions of the meta-model means a single logical entity and does not preclude implementations in which multiple linked modules of a meta-model are unified according to a predefined structure such that the linked modules act as a single meta-model.

Implementations of the current subject matter as described herein can be used for the visualization of scenario models (e.g. templates or the like for business scenarios) as well as for the visualization of concrete scenario instances, for example to illustrate the current status of a specific instance of a given business scenario. Inclusion of this feature can incorporate one or more features as described in one or more of the related co-pending and co-owned U.S. patent application listed in the first paragraph of this specification.

Figure 4:
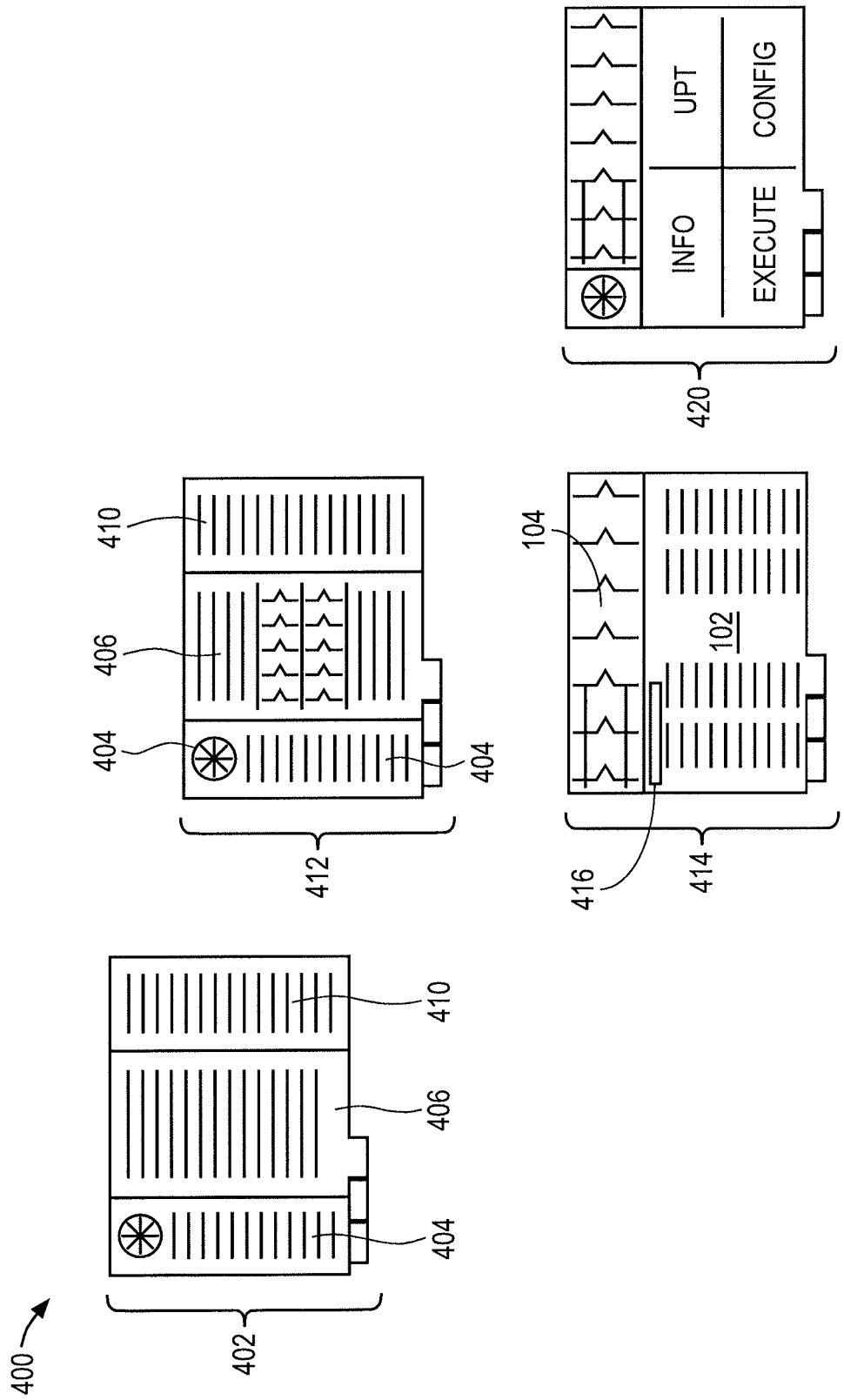
FIG. 4 shows a sequence of screenshots illustrating features (smooth drill-down navigation to increasing levels of detail) consistent with implementations of the current subject matter.

FIG. 4 shows a progression 400 of screenshots 402, 412, 414, 420 illustrating an example of an alternative approach via which transitions between abstraction layers of a scenario or process meta-model can be visualized. In a first screen view 402, a first pane 404 can include features similar to those shown in the navigation pane 102 in the screenshot 100 of FIG. 1. A second pane 406 can include a welcome screen or startup information, etc., and a third pane 410 can show other information, for example a daily task list, links to specific application environments, links to predefined performance metrics, etc. Section of a specific feature in the first pane 404 can cause the second pane 406 to morph to display a map, an overview, or the like illustrating business process features in one or more scenarios related to the selection made as shown in the screenshot 412. For example, a selection made in the screenshot 402 can be of a specific scenario meta-model, and the view in the screenshot 412 can provide for selection of specific business scenario instances based upon that scenario meta-model. The third pane 410 in the screenshot 412 can optionally include a listing of business process features relating to a selected specific business scenario instance such that selection of one of those business process features causes the display to further morph to the view shown in the screenshot 414 in which a navigation pane 104 shows a linear progression of business process features in a business scenario and a work pane 102 shows features relating to performance of tasks relating to a specific business process feature or business process features of a specific instance of the business scenario. Selection of a user interface feature or features 416 can link to a view as shown in the screenshot 420, in which additional functionality, such as for example key performance indicator metrics, execution plans, system configurations, additional information about a task or business process feature, etc., can be accessed via interaction with one or more associated user interface features.

Figure 5:
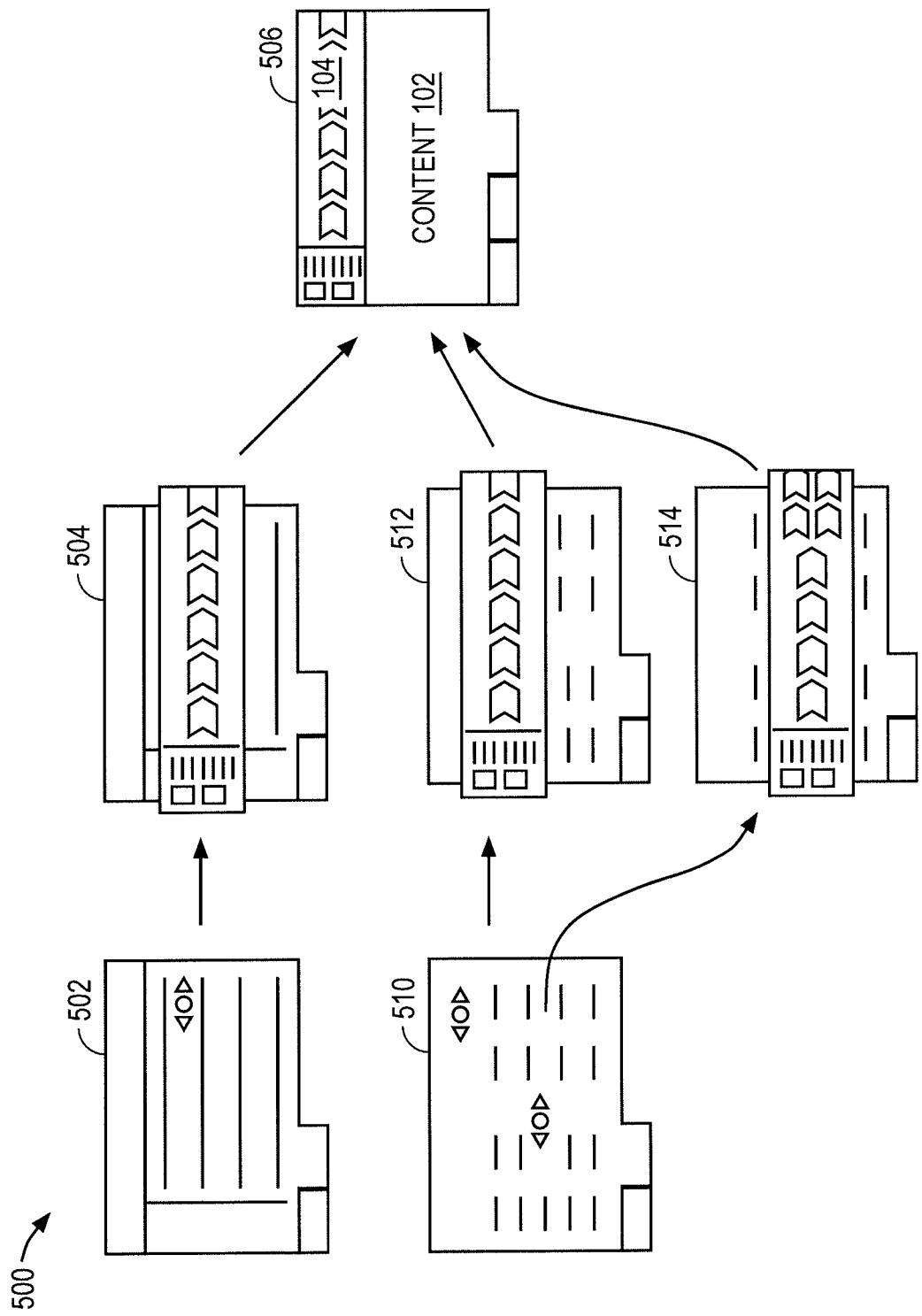
FIG. 5 shows another sequence of screenshots illustrating features (variant of FIG. 4 with in-place display of details) consistent with implementations of the current subject matter.

FIG. 5 shows a progression 500 of screenshots 502, 504, 506, 510, 512, 514 illustrating an example of alternative user interface progressions that a user can follow to seamlessly navigate to a content screen 506 in which data entry, data delivery, task completion etc. can be supported. In the screenshot 502, a listing of business scenarios can be provided such that selection of a user interface feature associated with one of the business scenarios can link to a view as in the screenshot 504 in which a linear business scenario map illustrating a meta-model of the selected business scenario can be highlighted. Further selection of a business process feature within the selected business scenario can link to a view such as is show in the screenshot 506, in which content is displayed in a work pane 102 and a scenario map is displayed in a navigation pane 104. In the screenshot 510, the user can first select a business scenario (for example via an in-place menu) and then select a user interface element relating to an existing instance of the business scenario, thereby linking to the view in the screenshot 512, form which selection of a specific business process feature links to the screenshot 506 as discussed above. Note that the process features in views 504, 512 and 514 are displayed as a magnified in-place view, thereby keeping the user context as stable as possible and, in particular, allowing a fast vertical scroll through the list of underlying process instances (in views 502 and 510) while switching to view the process features of the currently selected instance. The content in the work pane 102 can be prepopulated with content relating to the specific instance. A user can reach the screenshot 514, and from it the screenshot 506, by selecting the specific instance directly from within the view of the screenshot 510.

Figure 6:
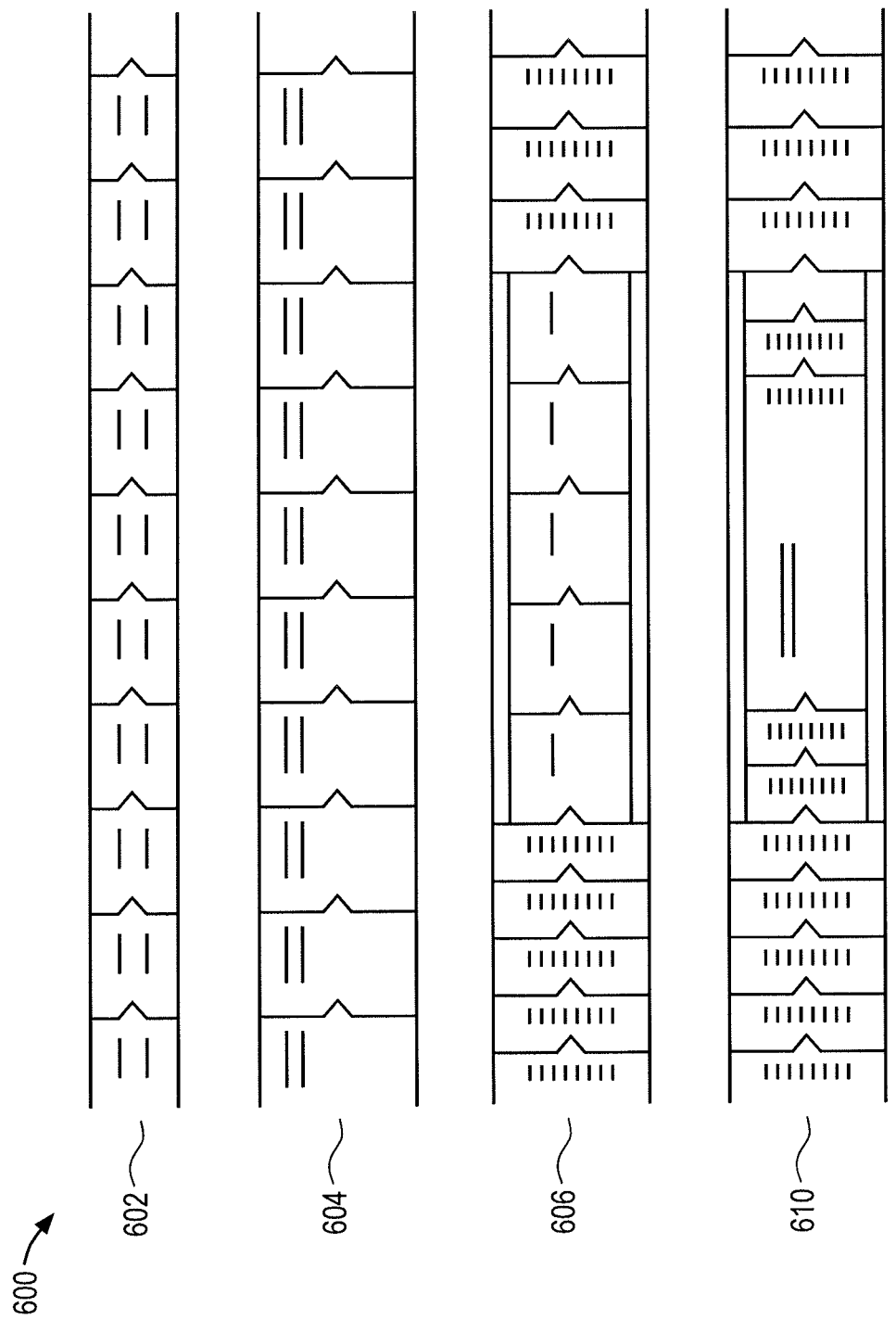
FIG. 6 shows a examples of visual representations of a linear progression of business process features in a business scenario having features consistent with implementations of the current subject matter.

FIG. 6 shows a view 600 of several possible visual depictions of a linear scenario view, which can be used in a navigation pane 104 such as discussed elsewhere in this disclosure. In the view 602, the navigation pane can include each business process feature of a business scenario depicted as an equally-sized icon, with the icons displayed in a series to represent the linear progression of the business scenario. The view 604 illustrates how a currently active business process feature can be magnified relative to the other business process features to allow additional information to be provided within its icon. The view 606 illustrates an example of compressing the linear progression for business process features that are more removed from the currently active business process features while expanding the active business process feature and those business process features that are close to it in the linear sequence of the meta-model of the business scenario. The view 610 illustrates another example in which the currently active business process feature is expanded and the other business process feature icons are compressed relative to their distance from the currently active business process feature in the linear representation of the business scenario.

Figure 7:
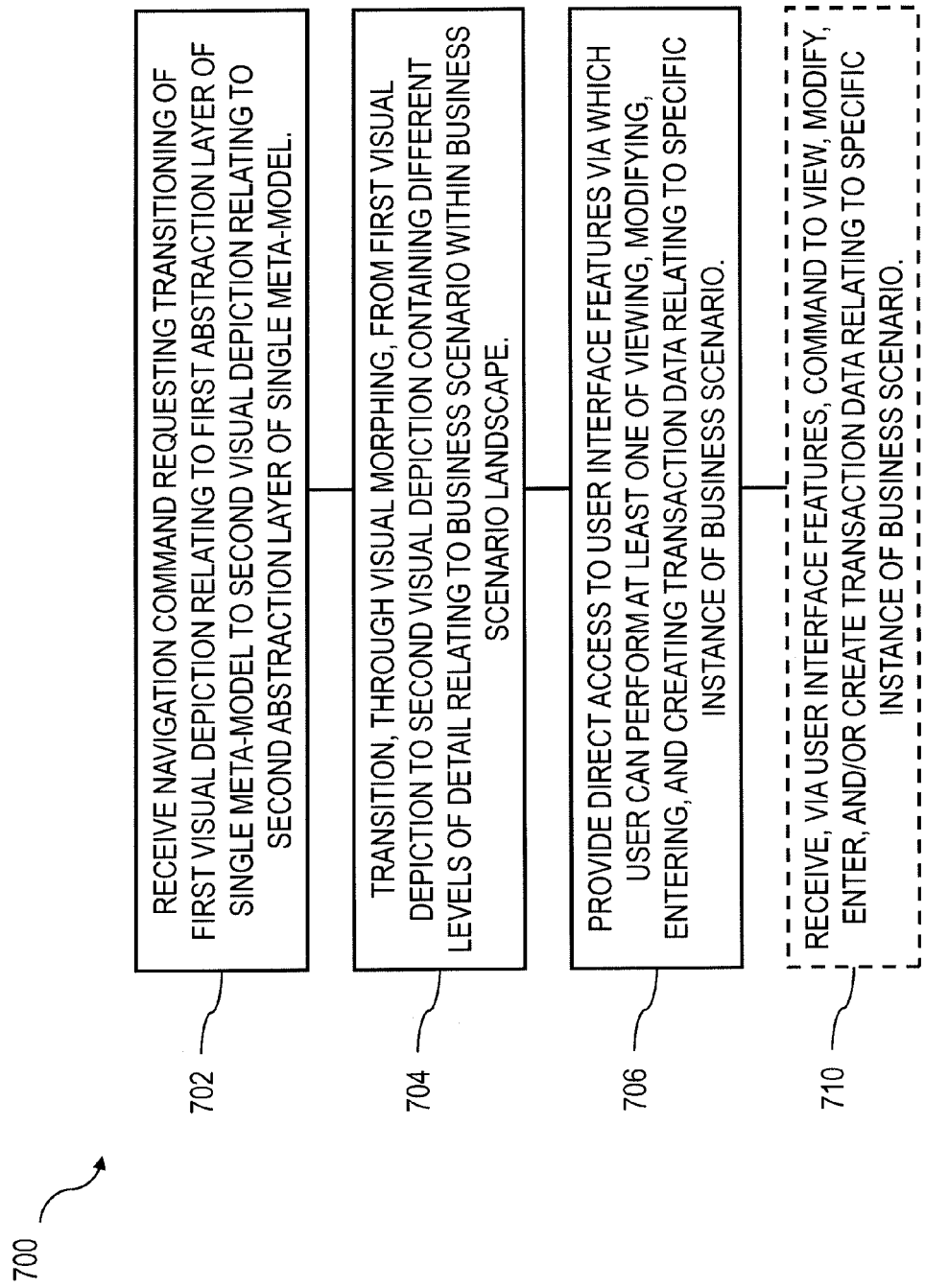
FIG. 7 is a process flow diagram illustrating aspects of a method having one or more features consistent with implementations of the current subject matter.

FIG. 7 shows a process flow chart 700 illustrating a method having one or more features consistent with implementations of the current subject matter. At 702, a navigation command requesting transitioning of a first visual depiction relating to a first abstraction layer of a single meta-model to a second visual depiction relating to a second abstraction layer of the single meta-model can be received via interaction by a user with the first visual depiction. The single meta-model can include metadata defining a business scenario landscape, which can include a plurality of business scenarios accessible to members of an organization and supported by a business software architecture. The metadata can include business scenario definitions and relationships between business scenarios in the business scenario landscape. At 704, a transition can occur through visual morphing from the first visual depiction to the second visual depiction. The first visual depiction and the second visual depiction can contain different levels of detail relating to a business scenario within the business scenario landscape for the organization. Through each of the first visual depiction and the second visual depiction displayed on a display device, direct access can be provided at 706 to user interface features via which the user is enabled to perform at least one of viewing, modifying, entering, and creating transaction data relating to a specific instance of the business scenario. At 710, a command to view, modify, enter, and/or create transaction data relating to the specific instance of the business scenario can optionally be received via the user interface features, for example in a work pane 102 as discussed above.

In some implementations of the current subject matter, the various abstraction layers and the visual depiction associated with each abstraction layer can be used in conjunction with sales of a business software architecture. For example, features of the business software architecture and/or external software components that can be integrated with the business software architecture can be illustrated in different manners depending on whether a specific organization is currently paying for access to such features or not. Other visual cues can be provided to indicate degree of usage of one or more features, or to indicate currently unpurchased features that might benefit the organization.

A user may need or desire to access detailed business process or business scenario implementation information for a variety of reasons. For example, a user with administrative or other similar access or a corresponding role may use the detailed business process or business scenario information in the third visualization layer to implement a business scenario (e.g. a new scenario or a change to an existing scenario) in a technical system (e.g. at design time) or alternatively or in addition for business process or business scenario monitoring, error analysis, tracking activities etc. A different user role (e.g. developer, administrator, support agent) may perform one or more of these activities. The model hierarchy displayed via the third visualization layer can be used (and navigated within) from any starting point and in any direction, depending on the user intentions and/or needs. As a purely illustrative and non-limiting example, a developer might use the most detailed third visualization layer as a starting point and move progressively "upwards" in the navigation hierarchy so as to understand the end-to-end scenario he or she is working on and to see how it is embedded within the scenario landscape, and how it interacts with other scenarios within the scenario landscape.

Figure 8:
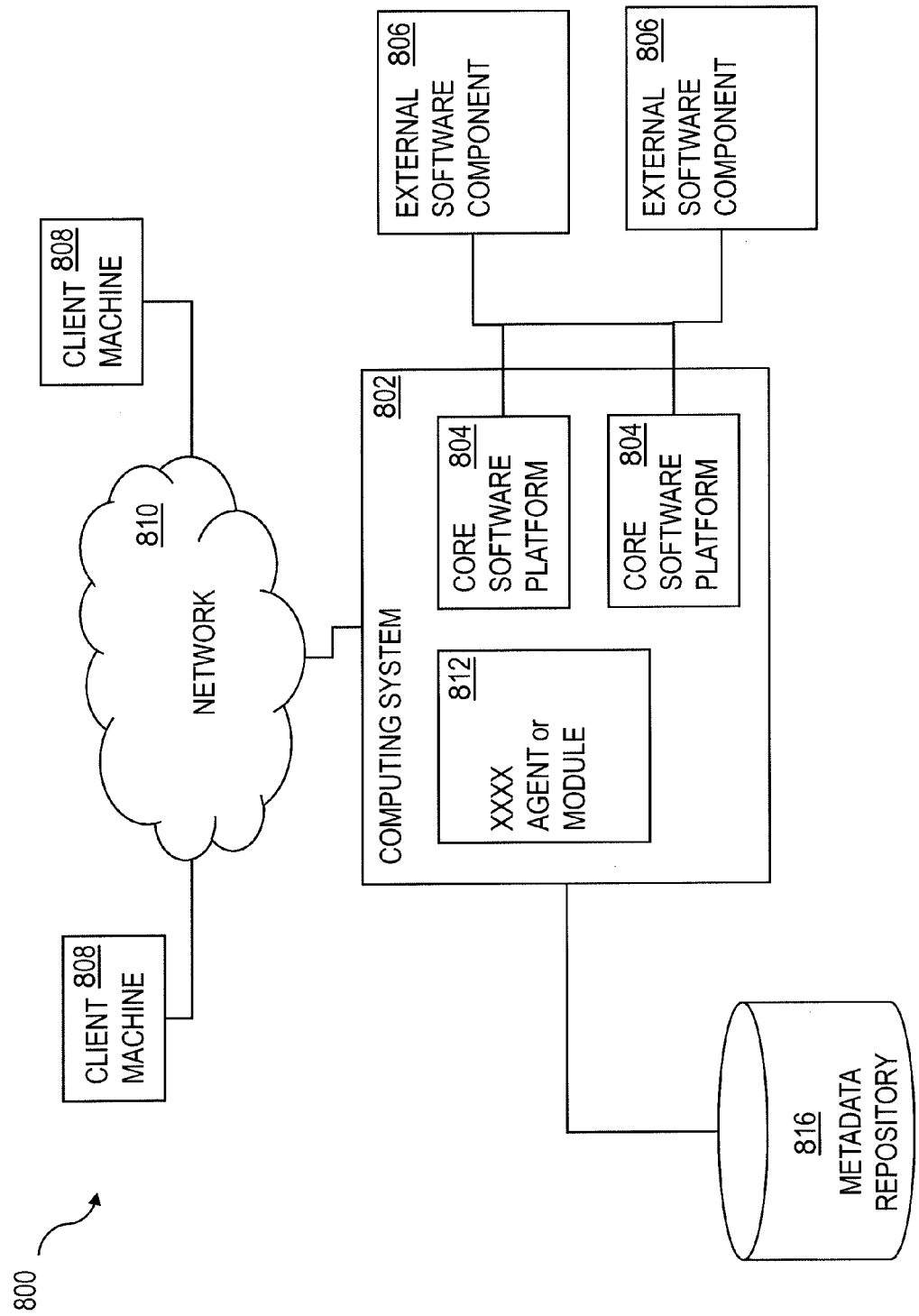
FIG. 8 is a diagram illustrating aspects of a system showing features consistent with implementations of the current subject matter.

The core software platform of an ERP software architecture can be provided as a standalone, customized software installation that runs on one or more processors that are under the control of the organization. This arrangement can be very effective for a large-scale organization that has very sophisticated in-house information technology (IT) staff and for whom a sizable capital investment in computing hardware and consulting services required to customize a commercially available ERP solution to work with organization-specific business processes and functions is feasible. FIG. 8 shows a diagram of a system consistent with such an implementation. A computing system 802 can include one or more core software platform modules 804 providing one or more features of the ERP system. The computing system can also aggregate or otherwise provide a gateway via which users can access functionality provided by one or more external software components. Client machines 808 can access the computing system, either via a direct connection, a local terminal, or over a network 810 (e.g. a local area network, a wide area network, a wireless network, the Internet, or the like). A business scenario guidance and recording module 812 can be hosted on the computing system 802 or alternatively, on an external system accessible over a network connection. The business scenario guidance and recording module 812 can optionally include one or more discrete software and/or hardware modules that perform operations such as those described herein.

The business scenario guidance and recording module 812 can access one or more metadata repositories 816 and/or other data repositories that can store the definition of business process as well as data relating to concrete instances of the data objects (e.g. business objects) that are relevant to a specific instance of the business process. In some examples, the definition can optionally be stored as a business object. In some implementations, the business object can include a template definition of a standard business process. The template definition that can optionally be modified via one or more extensions that are stored in the one or more metadata repositories 816.

Smaller organizations can also benefit from use of ERP functionality. However, such an organization may lack the necessary hardware resources, IT support, and/or consulting budget necessary to make use of a standalone ERP software architecture product and can in some cases be more effectively served by a software as a service (SaaS) arrangement in which the ERP system architecture is hosted on computing hardware such as servers and data repositories that are maintained remotely from the organization's location and accessed by authorized users at the organization via a thin client, such as for example a web browser, over a network.

In a software delivery configuration in which services of an ERP system are provided to each of multiple organizations are hosted on a dedicated system that is accessible only to that organization, the software installation at the dedicated system can be customized and configured in a manner similar to the above-described example of a standalone, customized software installation running locally on the organization's hardware. However, to make more efficient use of computing resources of the SaaS provider and to provide important performance redundancies and better reliability, it can be advantageous to host multiple tenants on a single system that includes multiple servers and that maintains data for all of the multiple tenants in a secure manner while also providing customized solutions that are tailored to each tenant's business processes.

Figure 9:
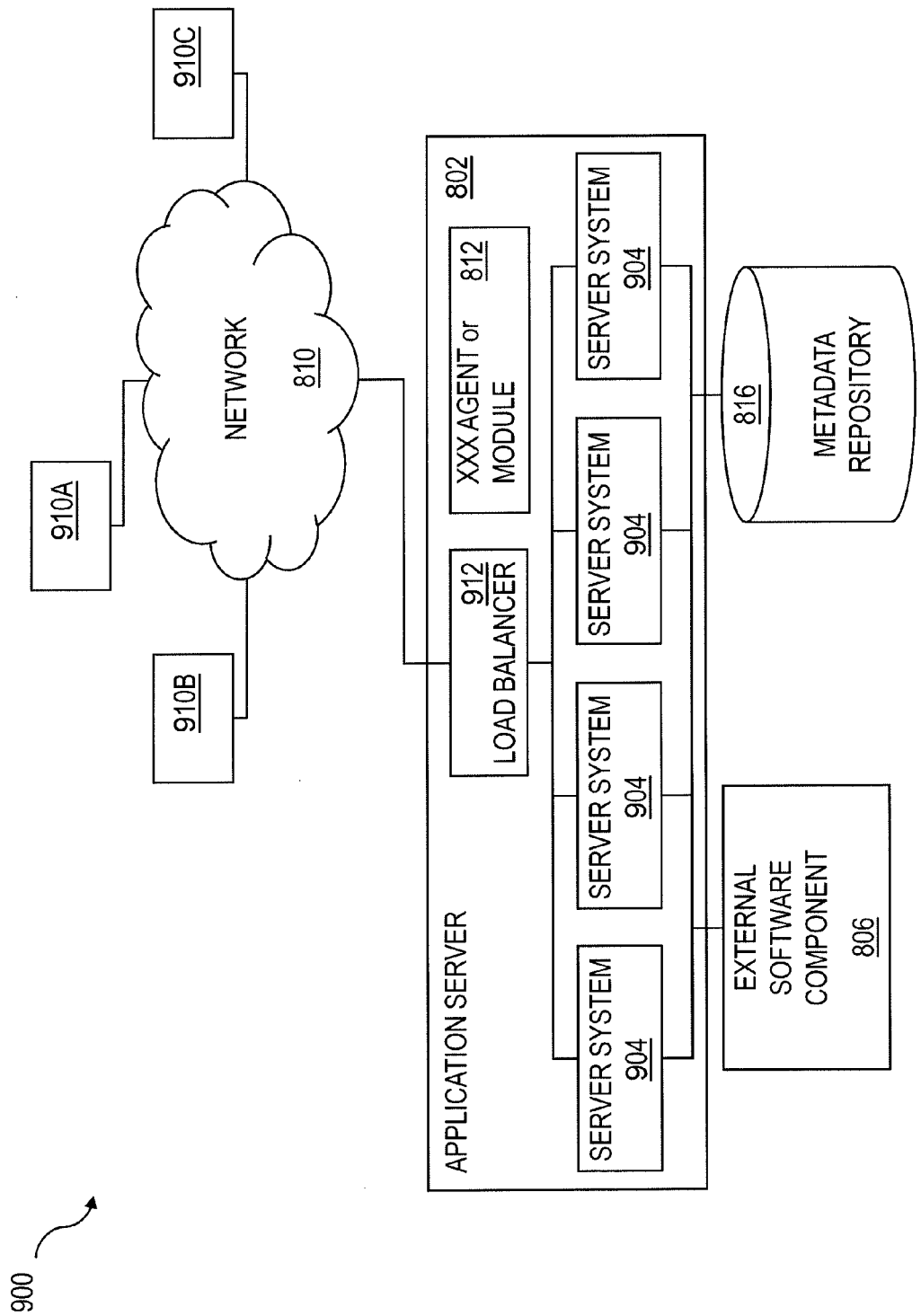
FIG. 9 is a diagram illustrating aspects of a system showing features consistent with implementations of the current subject matter.

FIG. 9 shows a block diagram of a multi-tenant implementation of a software delivery architecture 900 that includes an application server 902, which can in some implementations include multiple server systems 904 that are accessible over a network 810 from client machines operated by users at each of multiple organizations 910A-910C (referred to herein as "tenants" of a multi-tenant system) supported by a single software delivery architecture 900. For a system in which the application server 902 includes multiple server systems 904, the application server can include a load balancer 912 to distribute requests and actions from users at the one or more organizations 910A-910C to the one or more server systems 904. Instances of the core software platform 804 (not shown in FIG. 9) can be executed in a distributed manner across the server systems 904. A user can access the software delivery architecture across the network 810 using a thin client, such as for example a web browser or the like, or other portal software running on a client machine. The application server 902 can access data and data objects stored in one or more data repositories 816. The application server 902 can also serve as a middleware component via which access is provided to one or more external software components 806 that can be provided by third party developers.

A multi-tenant system such as that described herein can include one or more of support for multiple versions of the core software and backwards compatibility with older versions, stateless operation in which no user data or business data are retained at the thin client, and no need for tenant configuration on the central system. As noted above, in some implementations, support for multiple tenants can be provided using an application server 902 that includes multiple server systems 904 that handle processing loads distributed by a load balancer 912. Potential benefits from such an arrangement can include, but are not limited to, high and reliably continuous application server availability and minimization of unplanned downtime, phased updating of the multiple server systems 904 to permit continuous availability (one server system 904 can be taken offline while the other systems continue to provide services via the load balancer 912), scalability via addition or removal of a server system 904 that is accessed via the load balancer 912, and de-coupled lifecycle processes (such as for example system maintenance, software upgrades, etc.) that enable updating of the core software independently of tenant-specific customizations implemented by individual tenants.

As in the example illustrated in FIG. 8, the metadata repository 816 can store a business object that represents a template definition of a standard business process. Each individual tenant 910A-910C can customize that standard template according to the individual business process features specific to business of the organization to which that tenant is assigned. Customizations can be stored as extensions in the metadata repository.

Figure 10:
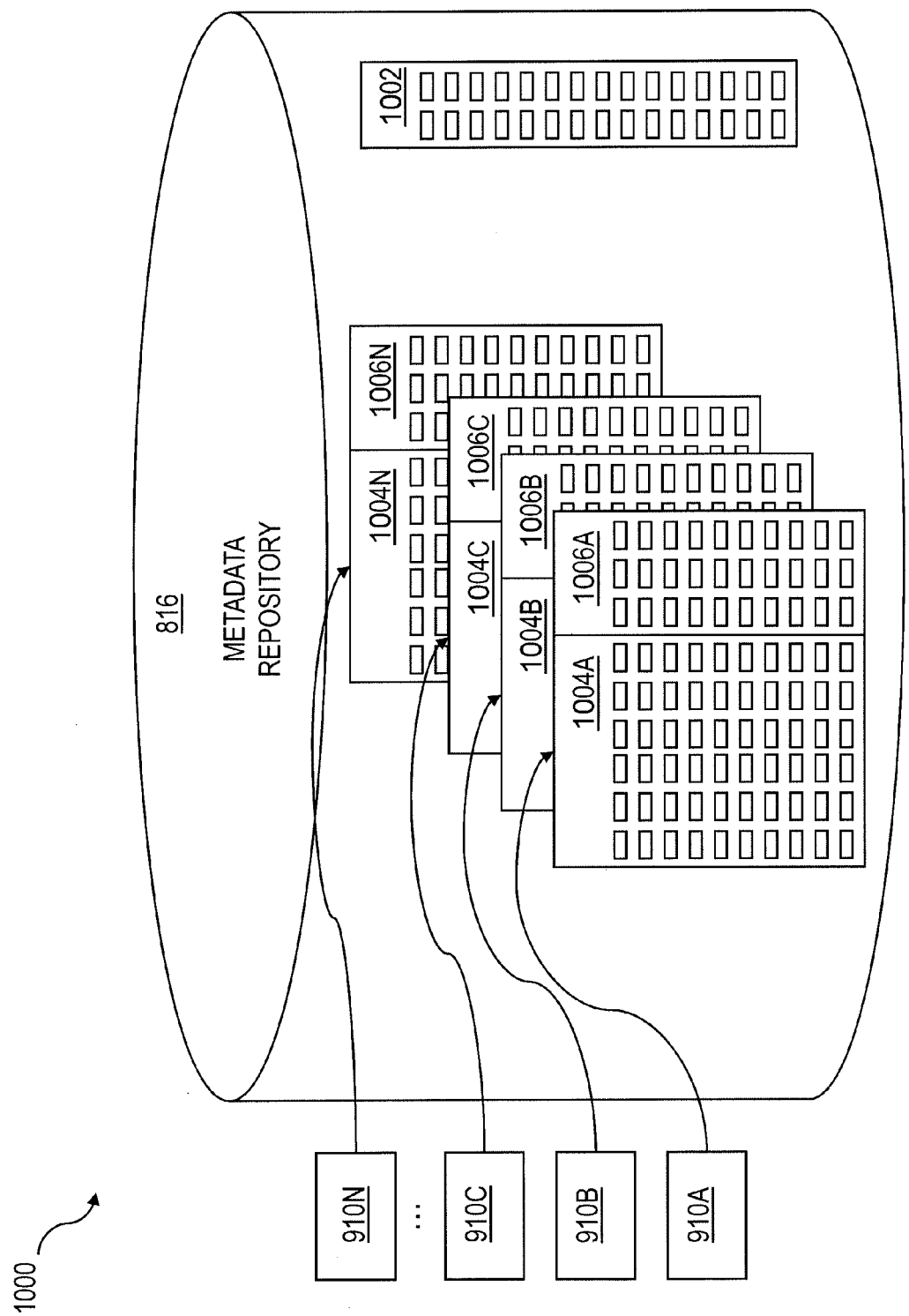
FIG. 10 is a diagram illustrating a data repository showing features consistent with implementations of the current subject matter.

To provide for customization of the business process for each of multiple organizations supported by a single software delivery architecture 900, the data and data objects stored in the metadata repository 816 and/or other data repositories that are accessed by the application server 902 can include three types of content as shown in FIG. 10: core software platform content 1002 (e.g. a standard definition of a business process), system content 1004 and tenant content 1006. Core software platform content 1002 includes content that represents core functionality and is not modifiable by a tenant. System content 1004 can in some examples be created by the runtime of the core software platform and can include core data objects that store concrete data associated with specific instances of a given business process and that are modifiable with data provided by each tenant. The data retained in these data objects are tenant-specific: for example, each tenant 910A-910N can store information about its own inventory, sales order, etc. Tenant content 1006A-1006N includes data objects or extensions to other data objects that are customized for one specific tenant 910A-910N to reflect business processes and data that are specific to that specific tenant and are accessible only to authorized users at the corresponding tenant. Such data objects can include a key field (for example "client" in the case of inventory tracking) as well as one or more of master data, business configuration information, transaction data or the like. For example, tenant content 1006 can reflect tenant-specific modifications or changes to a standard template definition of a business process as well as tenant-specific customizations of the business objects that relate to individual process step (e.g. records in generated condition tables, access sequences, price calculation results, other tenant-specific values, or the like). A combination of the software platform content 1002 and system content 1004 and tenant content 1006 of a specific tenant are accessed to provide the business process definition and/or the status information relating to a specific instance of the business process according to customizations and business data of that tenant such that each tenant is provided access to a customized solution whose data are available only to users from that tenant.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer program product comprising a non-transitory machine-readable medium storing instructions that, when executed by at least one programmable processor, cause the at least one programmable processor to perform operations comprising:
   receiving, via interaction by a user with a first visual depiction relating to a first abstraction layer of a single meta-model, a navigation command requesting transitioning of the first visual depiction to a second visual depiction relating to a second abstraction layer of the single meta-model, the single meta-model comprising metadata defining a business scenario landscape, the business scenario landscape comprising a plurality of business scenarios accessible to members of an organization and supported by a business software architecture, the metadata comprising business scenario definitions and relationships between business scenarios in the business scenario landscape;
   transitioning, through visual morphing, from the first visual depiction to the second visual depiction, the first visual depiction and the second visual depiction containing different levels of detail relating to a business scenario within the business scenario landscape for the organization; and
   providing, through each of the first visual depiction and the second visual depiction displayed on a display device, direct access to user interface features via which the user is enabled to perform at least one of viewing, modifying, entering, and creating transaction data relating to a specific instance of the business scenario.

2. A computer program product as in claim 1, wherein the first visual depiction comprises a plurality of first user interface elements forming a business scenario landscape map showing the business scenario and at least one other business scenario of the plurality of business scenarios and at least one relationship between the business scenario and the at least one other business scenario.

3. A computer program product as in claim 2, wherein the plurality of first user interface elements are arranged in the first visualization layer to form a scenario-centric view in which the business scenario is arranged approximately centrally in a scenario landscape map within the first visual depiction and with those of the plurality of first user interface elements representing business process features of the business scenario arranged substantially centrally and in a linear succession to show a linear ordering of the business process features and in which the at least one other business scenario is arranged to show the at least one relationship to the business scenario.

4. A computer program product as in claim 1, wherein the second visual depiction comprises a plurality of second user interface elements displayed in a navigation pane concurrently with a work pane, the plurality of second user interface elements being arranged in a linear progression to represent a linear sequence of a plurality of business process features of the business scenario, the work pane comprising a plurality of additional user interface elements corresponding to functionality provided by one or more feature modules of the business software architecture related to a currently selected one of the plurality of business process features.

5. A computer program product as in claim 1, wherein the single meta-model further comprises at least one of concrete data, detailed instance information, a key performance indicator, configuration information, and an organizational reference, the concrete data, the detailed instance information, the key performance indicator, the configuration information, and the organizational reference being associated with at least one of an in-progress instance of the business scenario and a completed instance of the business scenario.

6. A computer program product as in claim 1, wherein the operations further comprise providing access to the first visual depiction in response to selection by the user of a scenario browser user interface element in a welcome screen of the business software architecture.

7. A system comprising:
   at least one programmable processor; and
   a machine-readable medium storing instructions that, when executed by the at least one programmable processor, cause the at least one programmable processor to perform operations comprising:
   receiving, via interaction by a user with a first visual depiction relating to a first abstraction layer of a single meta-model, a navigation command requesting transitioning of the first visual depiction to a second visual depiction relating to a second abstraction layer of the single meta-model, the single meta-model comprising metadata defining a business scenario landscape, the business scenario landscape comprising a plurality of business scenarios accessible to members of an organization and supported by a business software architecture, the metadata comprising business scenario definitions and relationships between business scenarios in the business scenario landscape;
   transitioning, through visual morphing, from the first visual depiction to the second visual depiction, the first visual depiction and the second visual depiction containing different levels of detail relating to a business scenario within the business scenario landscape for the organization; and
   providing, through each of the first visual depiction and the second visual depiction displayed on a display device, direct access to user interface features via which the user is enabled to perform at least one of viewing, modifying, entering, and creating transaction data relating to a specific instance of the business scenario.

8. A system as in claim 7, wherein the first visual depiction comprises a plurality of first user interface elements forming a business scenario landscape map showing the business scenario and at least one other business scenario of the plurality of business scenarios and at least one relationship between the business scenario and the at least one other business scenario.

9. A system as in claim 8, wherein the plurality of first user interface elements are arranged in the first visualization layer to form a scenario-centric view in which the business scenario is arranged approximately centrally in a scenario landscape map within the first visual depiction and with those of the plurality of first user interface elements representing business process features of the business scenario arranged substantially centrally and in a linear succession to show a linear ordering of the business process features and in which the at least one other business scenario is arranged to show the at least one relationship to the business scenario.

10. A system as in claim 7, wherein the second visual depiction comprises a plurality of second user interface elements displayed in a navigation pane concurrently with a work pane, the plurality of second user interface elements being arranged in a linear progression to represent a linear sequence of a plurality of business process features of the business scenario, the work pane comprising a plurality of additional user interface elements corresponding to functionality provided by one or more feature modules of the business software architecture related to a currently selected one of the plurality of business process features.

11. A system as in claim 7, wherein the single meta-model further comprises at least one of concrete data, detailed instance information, a key performance indicator, configuration information, and an organizational reference, the concrete data, detailed instance information, the key performance indicator, configuration information, and the organizational reference being associated with at least one of an in-progress instance of the business scenario and a completed instance of the business scenario.

12. A system as in claim 7, wherein the operations further comprise providing access to the first visual depiction in response to selection by the user of a scenario browser user interface element in a welcome screen of the business software architecture.

13. A computer-implemented method comprising:
receiving, via interaction by a user with a first visual depiction relating to a first abstraction layer of a single meta-model, a navigation command requesting transitioning of the first visual depiction to a second visual depiction relating to a second abstraction layer of the single meta-model, the single meta-model comprising metadata defining a business scenario landscape, the business scenario landscape comprising a plurality of business scenarios accessible to members of an organization and supported by a business software architecture, the metadata comprising business scenario definitions and relationships between business scenarios in the business scenario landscape;
transitioning, through visual morphing, from the first visual depiction to the second visual depiction, the first visual depiction and the second visual depiction containing different levels of detail relating to a business scenario within the business scenario landscape for the organization; and
providing, through each of the first visual depiction and the second visual depiction displayed on a display device, direct access to user interface features via which the user is enabled to perform at least one of viewing, modifying, entering, and creating transaction data relating to a specific instance of the business scenario.

14. A computer-implemented method as in claim 13, wherein the first visual depiction comprises a plurality of first user interface elements forming a business scenario landscape map showing the business scenario and at least one other business scenario of the plurality of business scenarios and at least one relationship between the business scenario and the at least one other business scenario.

15. A computer-implemented method as in claim 14, wherein the plurality of first user interface elements are arranged in the first visualization layer to form a scenario-centric view in which the business scenario is arranged approximately centrally in a scenario landscape map within the first visual depiction and with those of the plurality of first user interface elements representing business process features of the business scenario arranged substantially centrally and in a linear succession to show a linear ordering of the business process features and in which the at least one other business scenario is arranged to show the at least one relationship to the business scenario.

16. A computer-implemented method as in claim 13, wherein the second visual depiction comprises a plurality of second user interface elements displayed in a navigation pane concurrently with a work pane, the plurality of second user interface elements being arranged in a linear progression to represent a linear sequence of a plurality of business process features of the business scenario, the work pane comprising a plurality of additional user interface elements corresponding to functionality provided by one or more feature modules of the business software architecture related to a currently selected one of the plurality of business process features.

17. A computer-implemented method as in claim 13, wherein the single meta-model further comprises at least one of concrete data, detailed instance information, a key performance indicator, configuration information, and an organizational reference, the concrete data, detailed instance information, the key performance indicator, configuration information, and the organizational reference being associated with at least one of an in-progress instance of the business scenario and a completed instance of the business scenario.

18. A computer-implemented method as in claim 13, further comprising providing access to the first visual depiction in response to selection by the user of a scenario browser user interface element in a welcome screen of the business software architecture.

19. A computer-implemented method as in claim 13, wherein at least one of the receiving, the transitioning, and the providing access are performed by at least one programmable processor.

* * * * *